United States Patent
Walls

(10) Patent No.: US 10,455,230 B2
(45) Date of Patent: Oct. 22, 2019

(54) METHODS FOR IMPROVING LOW-COST VIDEO/IMAGE COMPRESSION

(71) Applicant: Broadcom Corporation, Irvine, CA (US)

(72) Inventor: Frederick George Walls, Grafton, WI (US)

(73) Assignee: AVAGO TECHNOLOGIES INTERNATIONAL SALES PTE. LIMITED, Singapore (SG)

(*) Notice: Subject to any disclaimer, the term of this patent is extended or adjusted under 35 U.S.C. 154(b) by 701 days.

(21) Appl. No.: 14/984,713

(22) Filed: Dec. 30, 2015

(65) Prior Publication Data

US 2016/0205399 A1 Jul. 14, 2016

Related U.S. Application Data

(60) Provisional application No. 62/101,557, filed on Jan. 9, 2015, provisional application No. 62/189,920, filed
(Continued)

(51) Int. Cl.
*H04N 19/112* (2014.01)
*H04N 19/136* (2014.01)
(Continued)

(52) U.S. Cl.
CPC ......... *H04N 19/112* (2014.11); *H04N 19/117* (2014.11); *H04N 19/136* (2014.11); *H04N 19/186* (2014.11)

(58) Field of Classification Search
CPC .... H04N 19/186; H04N 19/85; H04N 19/136; H04N 19/46; H04N 19/59; H04N 19/70; H04N 19/117; H04N 19/80; H04N 19/44; H04N 19/176; H04N 19/13; H04N 19/124; H04N 19/593; H04N 19/103; H04N 19/157

See application file for complete search history.

(56) References Cited

U.S. PATENT DOCUMENTS 8,139,081 B1 3/2012 Daniel
8,155,454 B2 * 4/2012 Raveendran ............ G06T 5/007
375/240.01
(Continued)

FOREIGN PATENT DOCUMENTS

CN 101491102 A 7/2009
CN 106464887 2/2017
CN 108337519 7/2018

OTHER PUBLICATIONS

Wu et al., "Tunneling High-Resolution Color Content through 4:2:0 HEVC and AVC Video Coding System," Conference Paper in Proceedings of the Data Compression Conference, Mar. 2013, 10 pages.

*Primary Examiner* — Tsion B Owens
*Assistant Examiner* — Kehinde Abimbola
(74) *Attorney, Agent, or Firm* — Morgan, Lewis & Bockius LLP

(57) ABSTRACT

A method and system for coding or decoding is disclosed. The system or method may receive a chroma subsampled picture and map the chroma subsampled picture into a non chroma subsampled format picture. The system or method may receive a non chroma subsampled picture and remap the samples into a chroma subsampled picture.

21 Claims, 11 Drawing Sheets

Related U.S. Application Data on Jul. 8, 2015, provisional application No. 62/266,890, filed on Dec. 14, 2015.

(51) Int. Cl.
  *H04N 19/186* (2014.01)
  *H04N 19/117* (2014.01)

(56) References Cited

U.S. PATENT DOCUMENTS

| | | | | |
|---|---|---|---|---|
| 8,253,752 | B2* | 8/2012 | Raveendran | G06T 5/007 |
| | | | | 345/472 |
| 8,368,706 | B2* | 2/2013 | Tamaoki | G06F 3/1431 |
| | | | | 345/501 |
| 8,625,666 | B2* | 1/2014 | Bakke | H04N 19/186 |
| | | | | 345/589 |
| 8,922,578 | B2* | 12/2014 | Hunleth | H04N 9/641 |
| | | | | 345/582 |
| 2008/0018506 | A1* | 1/2008 | Raveendran | G06T 5/007 |
| | | | | 341/51 |
| 2008/0024513 | A1* | 1/2008 | Raveendran | G06T 5/007 |
| | | | | 345/589 |
| 2010/0103180 | A1* | 4/2010 | Tamaoki | G06F 3/1431 |
| | | | | 345/522 |
| 2010/0232497 | A1 | 9/2010 | MacInnis et al. | |
| 2011/0305282 | A1 | 12/2011 | MacInnis | |
| 2012/0008679 | A1* | 1/2012 | Bakke | H04N 19/186 |
| | | | | 375/240.08 |
| 2012/0307151 | A1* | 12/2012 | Hunleth | H04N 1/46 |
| | | | | 348/554 |
| 2014/0092960 | A1 | 4/2014 | MacInnis et al. | |
| 2014/0092998 | A1* | 4/2014 | Zhu | H04N 19/70 |
| | | | | 375/240.29 |
| 2014/0294089 | A1 | 10/2014 | MacInnis et al. | |
| 2015/0172616 | A1 | 6/2015 | Ye et al. | |
| 2015/0256833 | A1* | 9/2015 | Kim | H04N 19/132 |
| | | | | 375/240.02 |
| 2016/0330457 | A1* | 11/2016 | Ye | H04N 9/67 |
| 2017/0019672 | A1* | 1/2017 | Kim | H04N 19/186 |

* cited by examiner

1100

| 1 | 1 | 2 | 3 | 4 |
|---|---|---|---|---|
| 1 | 2 | 3 | 4 | 5 |
| 2 | 3 | 4 | 5 | 6 |
| 3 | 4 | 5 | 6 | 7 |

. . .

| w-3 | w-2 | w-1 |
|---|---|---|
| w-2 | w-1 | w |
| w-1 | w | w+1 |
| w | w+1 | w+1 |

Figure 11

METHODS FOR IMPROVING LOW-COST VIDEO/IMAGE COMPRESSION

PRIORITY CLAIM

This application claims priority to provisional application Ser. No. 62/266,890, filed Dec. 14, 2015, to provisional application Ser. No. 62/189,920, filed Jul. 8, 2015, and to U.S. Ser. No. 62/101,557, filed Jan. 9, 2015, entitled "Methods For Improving Low-Cost Video/Image Compression", which are entirely incorporated by reference.

CROSS REFERENCE TO RELATED APPLICATIONS

This application incorporates by reference in their entirety U.S. application Ser. No. 12/720,273 (the '273 application), entitled "Lossless and near-lossless image compression," filed Mar. 9, 2010; Provisional Application U.S. 61/709,316 (the '316 application), entitled "Bounded Rate Near-Lossless And Lossless Image Compression," filed Oct. 3, 2012; U.S. Provisional Application Ser. No. 61/770,979 (the '979 application), entitled, "Indexed Color Cache," filed Feb. 28, 2013; U.S. Provisional Application Ser. No. 61/764,891 (the '891 application), entitled, "Enhanced Display Stream Compression," filed Feb. 14, 2013; U.S. Provisional Application Ser. No. 61/832,547 (the '547 application), entitled "Adaptive Filtering for Prediction in Image Compression" filed Jun. 7, 2013; U.S. Provisional Application Ser. No. 61/765,623 (the '623 application), entitled "Prediction in Video Compression"; U.S. Patent Application Publication No. 2011/0305282A1 (the '282 application) entitled Method and System for Zero Overhead Parallel Entropy Decoding; U.S. patent application Ser. No. 14/044,612 (the '612 application) entitled "Bounded Rate Compression with Rate Control for Slices"; and U.S. patent application Ser. No. 14/302,940 (the '940 application) entitled "Hybrid Transform-Based Compression".

TECHNICAL FIELD

This disclosure relates to systems and methods for video compression.

BACKGROUND

Rapid advances in electronics and communication technologies, driven by immense customer demand, have resulted in the worldwide adoption of devices that display a wide variety of video content. Examples of such devices include smartphones, flat screen televisions, and tablet computers. Improvements in video processing techniques will continue to enhance the capabilities of these devices.

DESCRIPTION OF THE DRAWINGS

FIG. 11 is a diagram illustrating another implementation of an alternate sample grouping.

DETAILED DESCRIPTION

Figure 1:
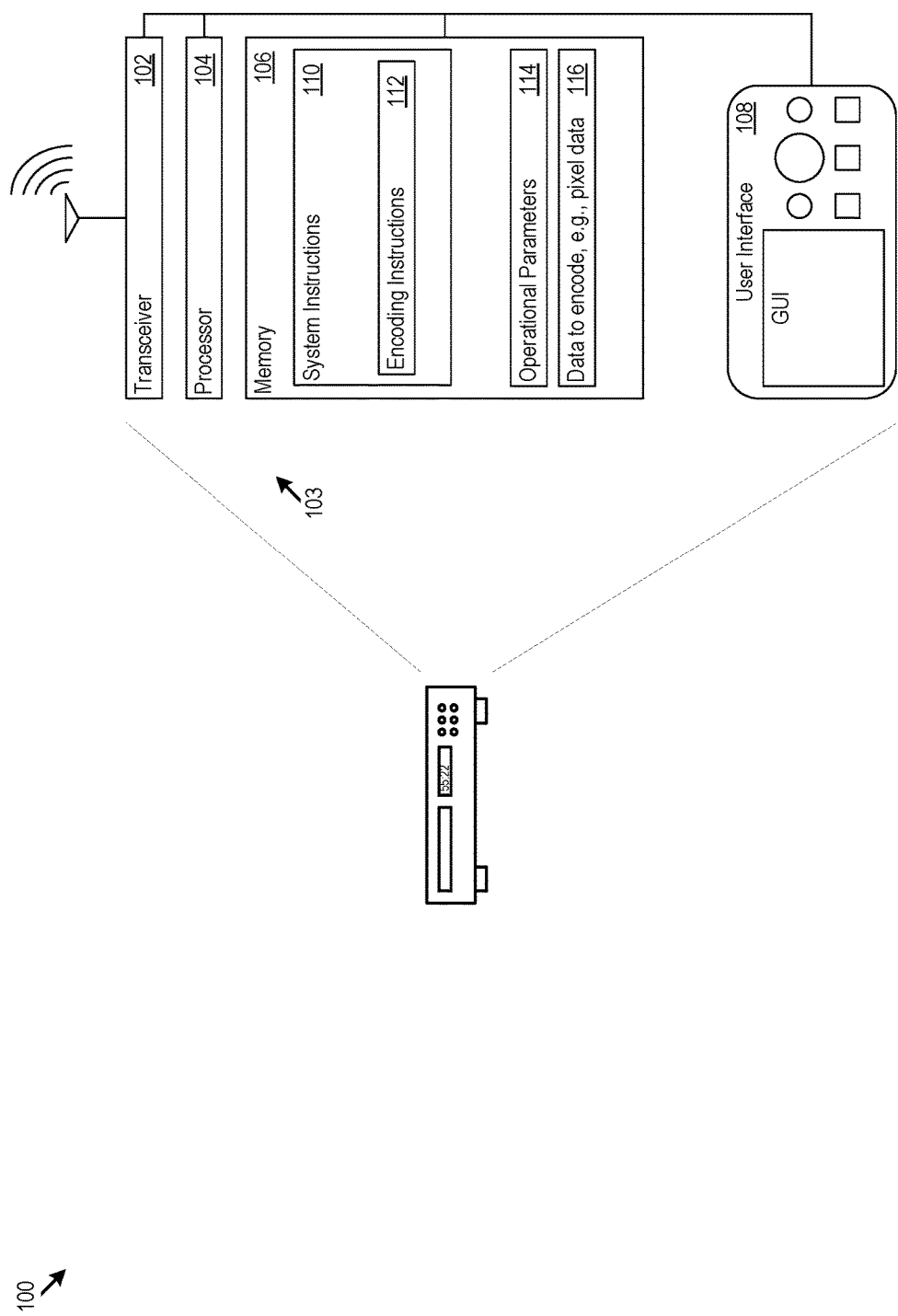
FIG. 1 is a block diagram illustrating an encoding system.

The '273 application discloses an image compression method. In one aspect of the method, a differential pulse code modulation (DPCM) is utilized to encode pixels of an image. DPCM may utilize a predictor. One of the predictors described is the Median Adaptive Predictor (MAP), which may be referred to as the LS predictor. In another aspect, a quantization parameter (QP) may be adjusted based on a fullness of a buffer model and on a measure of image activity. Buffer model fullness may be classified into a plurality of threshold ranges.

The '316 application discloses a method wherein embodiments may lower the QP on relatively smooth content. Certain content may possess "busy" areas adjacent to or near very smooth areas. QP may be adjusted downwards by a large amount quickly, e.g. within one Group, when the content is detected as being of low activity, and a reduced value may be used for each threshold range. The '316 application also discloses a method whereby implicit control of quantization (QP) and/or prediction is retained and combined with explicit control of quantization and/or prediction. In some implementations, the explicit portion of QP control may use, for example, 1 bit for each block of pixels, where a 0 value corresponds to a scenario where the implicit QP is used, and a 1 value corresponds to a scenario where the QP is reduced and/or increased from the implicit value by a predetermined amount.

The '891 application discloses a method for determining which pixels are perceptually sensitive. An encoder may select a smaller QP value for pixels that are determined to be sensitive. In some implementations, an encoder may utilize an indication in a compressed bit stream to indicate that a portion of image content is relatively flat, and it may adjust the rate control parameters accordingly.

The '979 application discloses the use of an indexed color cache mode for coding pixels. The use of indexed color cache may be indicated by an escape code.

The '547 application discloses the use of adaptive filtering to the pixels that are used for prediction.

The '683 application discloses a method of block prediction in video encoding.

The '282 application discloses a method of parallel entropy decoding of a bit stream with a plurality of portions of the bit stream multiplexed and de-multiplexed.

The '612 application discloses a coding algorithm with a method of rate control that ensures that a number of bits used to encode a slice fits within a budgeted number of bits.

The '940 application discloses the use of a hybrid transform mode.

The compression scheme described in the '612 application and related applications cited above utilizes DPCM and applies a median-adaptive predictor (MAP) to at least a subset of the samples in an image to improve compression efficiency. The present disclosure describes techniques to further improve coding efficiency, reduce artifacts, and/or reduce system cost. These techniques can be applied to the encoder, decoder, or both, depending on the system requirements.

An example device that may improve coding is shown in FIG. 1 in the context of an encoder 100. In the example given in FIG. 1, the encoder 100 includes a transceiver 102 and system logic 103 in communication with the transceiver 102. The system logic 103 may be implemented in hardware, software or both. In one implementation, the system logic 103 includes one or more processors 104, a memory 106, and a user interface 108.

The transceiver 102 may be wireless transceiver, and the transmitted and received signals may adhere to any of a diverse array of formats, protocols, modulations, frequency channels, bit rates, and encodings. Thus, the transceiver 402 may support the 802.11a/b/g/n/ac standards, the 60 GHz WiGig/802.11 TGad specification, Bluetooth, Global System for Mobile communications (GSM), Time Division Multiple Access (TDMA), Frequency Division Multiple Access (FDMA), Code Division Multiple Access (CDMA), or other wireless access techniques or protocols. The transceiver 102 may send and receive data coded according to the techniques described below.

The processor 104 executes the system instructions 110. The system instructions 110 may include an operating system, application programs, device firmware, video and audio coders, video and audio decoders, or other instructions. The system instructions 110 include encoding instructions 112. The encoding instructions 112 may implement in hardware, software, or both, any of the processing using an indexed color cache described below, such as any of the encoding processing described below.

The memory 106 also stores data to be encoded (e.g., images or a portion of an image and their pixel data) 116 and operational parameters 114 for the encoding instructions 112. Although, it is understood that the operational parameters 114 may be stored in a different physical memory than the pixel data. Examples of operational parameters 114 include parameters specifying which content (e.g. pixels) to process using the indexed color cache, for selecting an indexed color cache coding mode, an indexed color cache coding mode, index values, or any other parameters described below.

The system logic 103 of the encoder 100 may read the operational parameters 114, perform coding, and specify pixel values in a compressed bit stream using index values.

Figure 2:
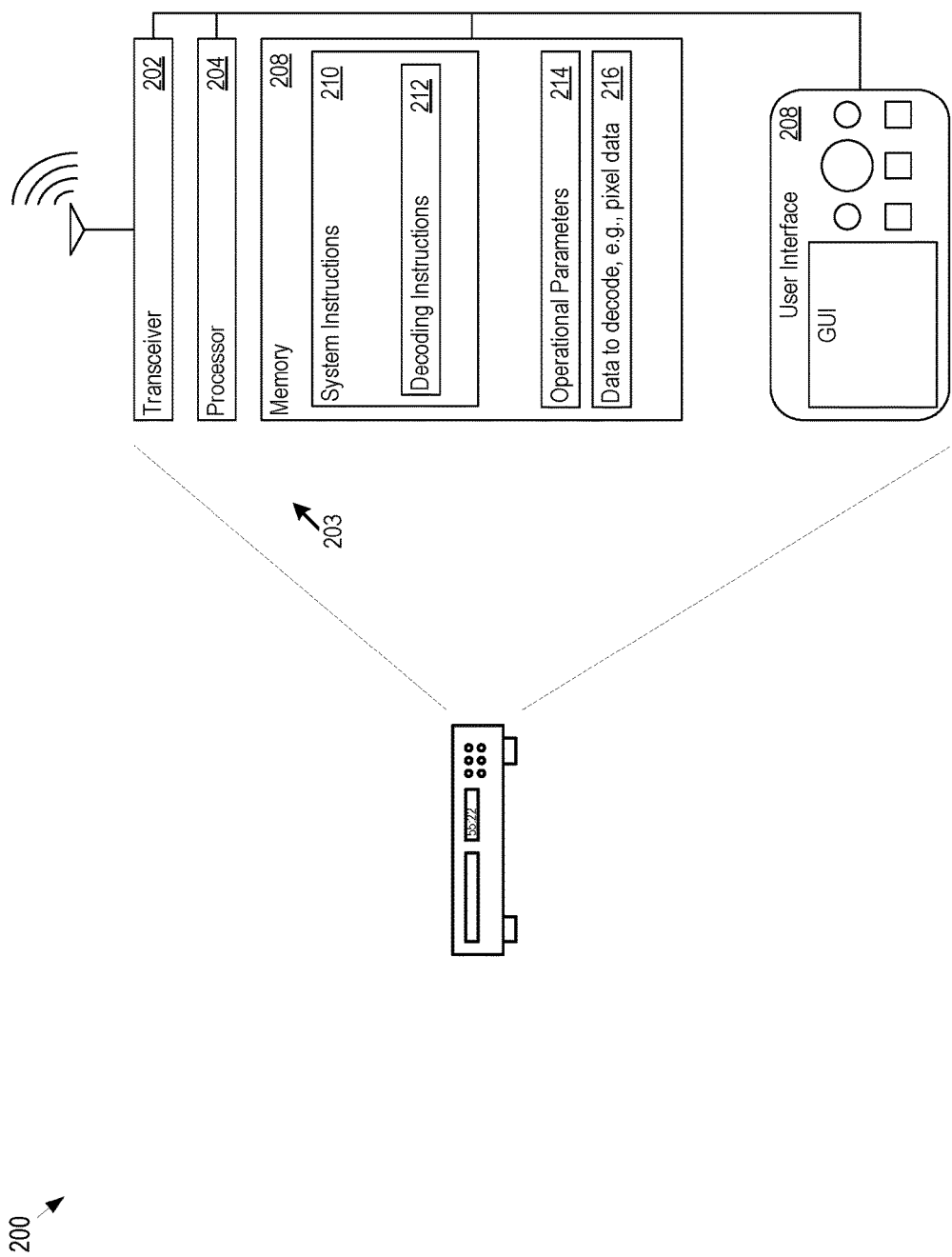
FIG. 2 is a block diagram illustrating an decoding system.

Another example device that may perform processing using an indexed colored cache is shown in FIG. 2 in the context of decoder 200 that performs decoding. In the example given in FIG. 2, the decoder 200 includes a transceiver 202 and system logic 203 in communication with the transceiver 202. The system logic 203 may be implemented in hardware, software or both. In one implementation, the system logic 203 includes one or more processors 204, a memory 206, and a user interface 208. The transceiver 202 may share any of the characteristics of the transceiver 102 described above.

The processor 204 executes the system instructions 210. The system instructions 210 may include an operating system, application programs, device firmware, video and audio coders, video and audio decoders, or other instructions. The system instructions 210 include decoding instructions 212. The decoding instructions 212 may implement in hardware, software, or both, any of the processing using an indexed color cache described below, such any of the decoding processing described below.

The memory 206 stores data to be decoded (e.g., compressed bitstream received from an encoder that can be decoded into pixel data) 216 and operational parameters 214 for the decoding instructions 212. Although, it is understood that the operational parameters 214 may be stored in a different physical memory than the pixel data. Examples of operational parameters 214 include parameters specifying which content (e.g. pixels) to process using the indexed color cache, for selecting an indexed color cache coding mode, an indexed color cache coding mode, index values, or any other parameters described below.

Some source pictures (e.g. images and/or video) are chroma subsampled, for example, 4:2:2 or 4:2:0 chroma subsampled. 4:2:0 may be a format for YCbCr pictures in which the chrominance components are horizontally and vertically subsampled by two. 4:2:2 may be a format for YCbCr pictures in which the chrominance components are horizontally subsampled by 2. Some pictures are not chroma subsampled such as 4:4:4 or 4:4:4:4 format. The 4:4:4 and 4:4:4:4 formats may be formats for RGB, RGBA, YCbCr, or YCbCrA video in which the chrominance components are not subsampled.

For certain display links, it is important to transmit chroma-subsampled pictures without converting to 4:4:4 format. This can enable visually lossless picture quality at lower bit rates than are possible with 4:4:4 format. In addition, conversions between 4:4:4 and 4:2:2 or 4:2:0 formats are generally lossy and should be avoided in order to avoid conversion artifacts. Therefore, an optimized 4:2:0 mode may enable encoders and decoders to run at approximately twice the throughput of 4:4:4 mode, which could lower system cost in links where a large raster size requires 4:2:0 support but not 4:4:4 support. An optimized 4:2:2 mode may enable encoders and decoders to run at approximately twice the throughput of 4:4:4 mode, which could lower system cost in links where a large raster size requires 4:2:2 support but not 4:4:4 support.

Figure 3:
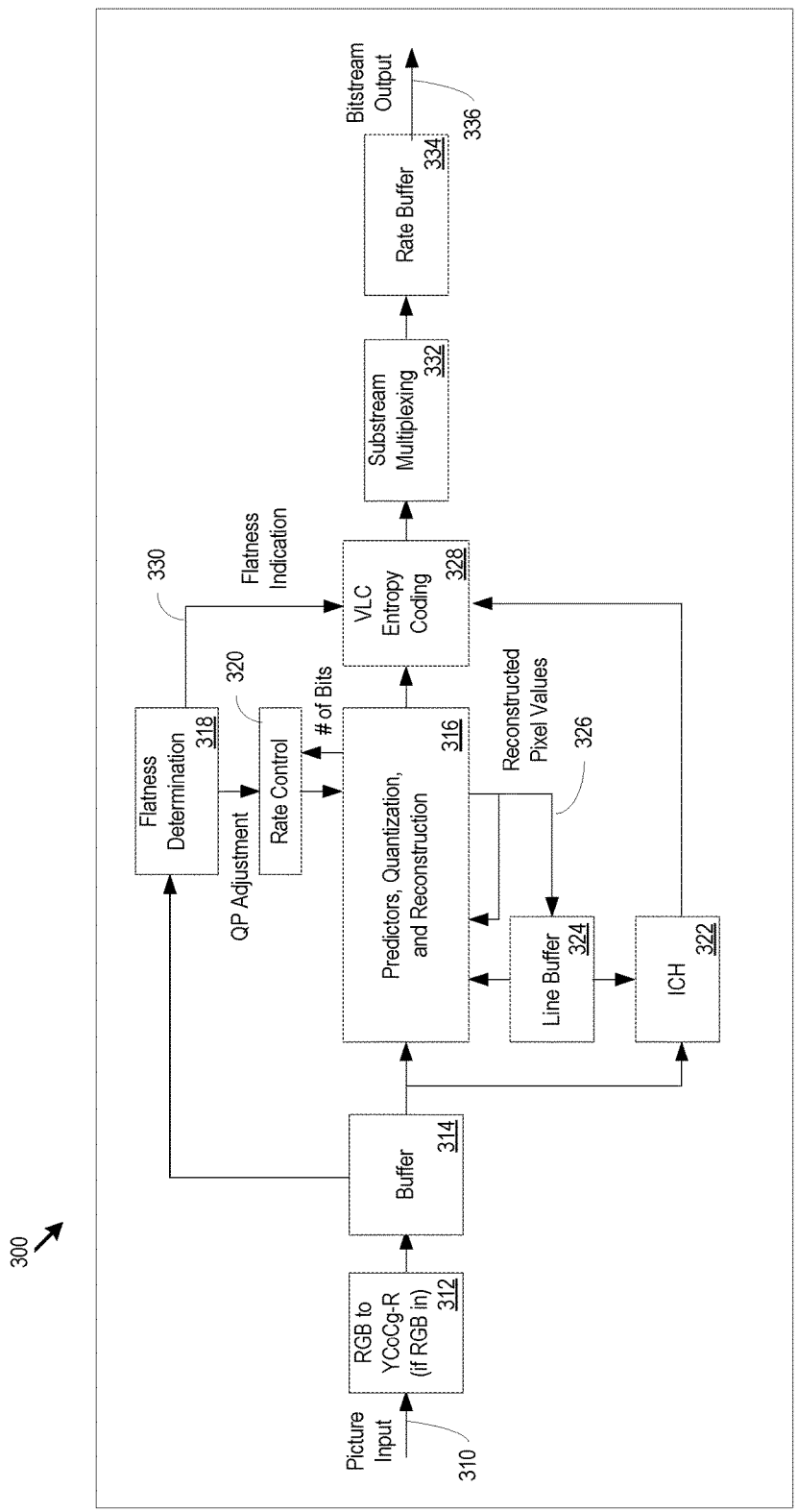
FIG. 3 is a block diagram of a video encoder.

Now referring to FIG. 3, a block diagram of an encoder 300 is provided. The encoder 300 receives a picture input 310. If the picture input is in RGB format, the image may be converted from RGB to YCoCgR by a color conversion unit 312. The picture is fed from the color conversion unit 312 to the buffer 314. The converted picture may then be provided to the flatness determination unit 318. A quantization adjustment may be provided from the flatness determination unit 318 to the rate control unit 320. The rate control unit 320 may provide a bit rate to the prediction, quantization, and reconstruction unit 316. The rate control unit 320 may receive a number of bits generated as feedback from the prediction, quantization, and reconstruction unit 316. The prediction, quantization, and reconstruction unit 316 may receive picture data directly from the buffer 314. Further, the ICH unit 322 may receive picture data from the buffer 314. Reconstructive pixel values 326 may be provided to the line buffer 324 and used internally as feedback in the prediction, quantization, and reconstruction unit 316. The line buffer 324 may hold the reconstructed pixel values 326 for later use by the prediction, quantization, and reconstruction unit 316 and also the ICH unit 322. The prediction, quantization, and reconstruction unit 316 may provide picture data to the entropy encoding unit 328. The entropy encoding unit 328 may also use a flatness indication 330 from the flatness determination unit 318 and ICH parameters from the ICH unit 322 and encode the image data based on these parameters. The encoded data is provided from the entropy encoding unit 328 to the substream multiplexing unit 332. The output of the substream multiplexing unit 332 is stored in the rate buffer 334 where it is later provided to a bit stream output unit 336.

Figure 4:
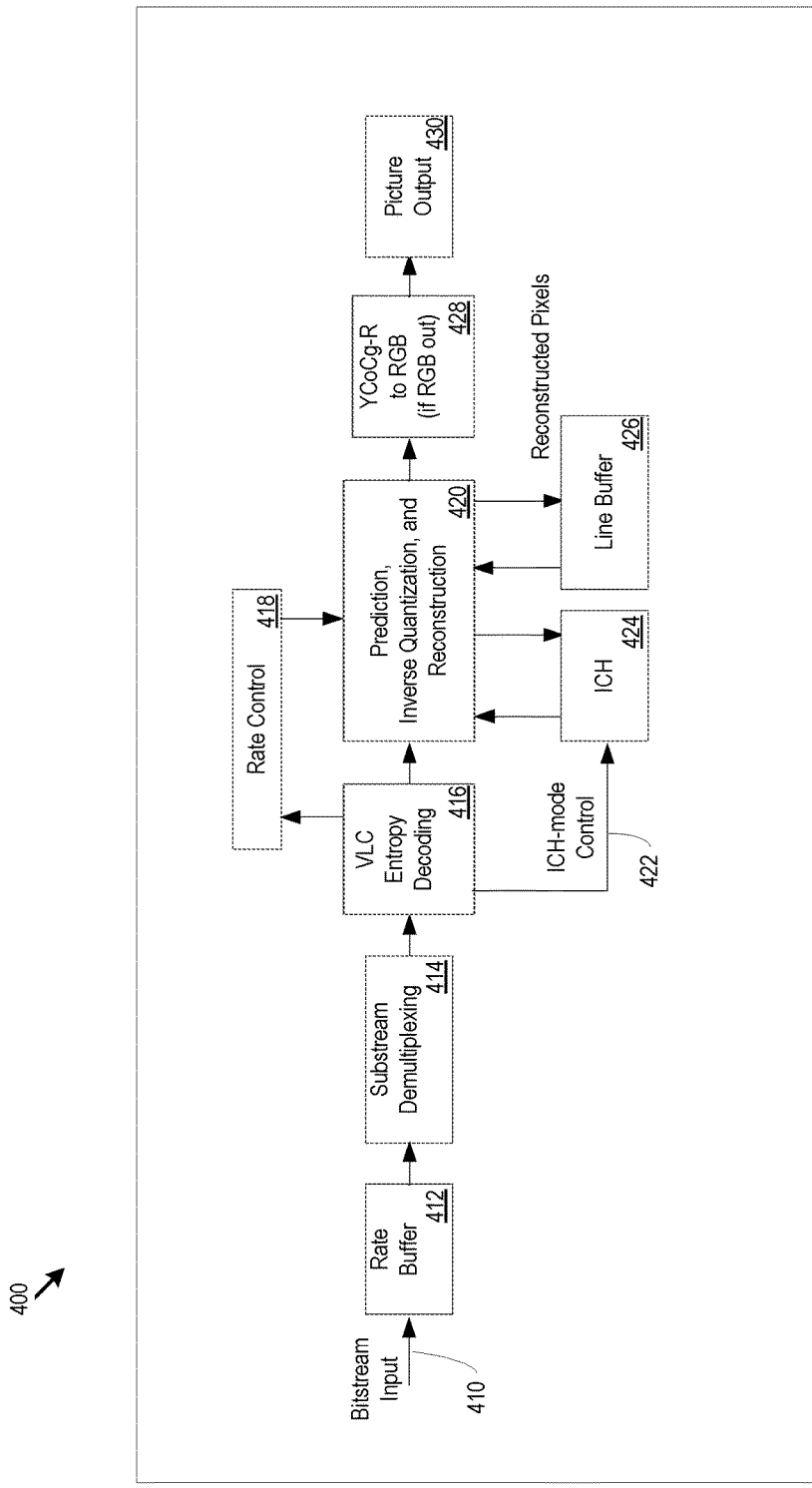
FIG. 4 is a block diagram of a video decoder.

Now referring to FIG. 4, a block diagram of a decoder 400 is provided. The decoder may receive a bit stream input 410. The bit stream input 410 may be stored in a rate buffer 412. A substream demultiplexing unit 414 may receive the bit stream input from the rate buffer 412. The demultiplexed bit stream may be provided from the substream demultiplexing unit 414 to the entropy decoding unit 416. Bit stream parameters may be provided from the entropy decoding unit 416 to the rate control unit 418. The rate control unit 418 may generate a quantization parameter which is provided to the prediction, inverse quantization, and reconstruction unit 420. The prediction, inverse quantization, and reconstruction unit 420 may receive the decoded picture data from the entropy decoding unit 416. In addition, the entropy decoding unit 416 may provide an ICH mode control signal 422 to the ICH unit 424. The ICH unit 424 may provide ICH parameters to the prediction, inverse quantization, and reconstruction unit 420. Feedback parameters may be provided from the prediction, inverse quantization, and reconstruction unit 420 to the ICH unit 424. The prediction, inverse quantization, and reconstruction unit 420 may also be in communication with a line buffer 426 for storing and retrieving reconstructed pixels from one or more previously decoded lines. Picture data may be provided from the prediction, inverse quantization, and reconstruction unit 420 to a color conversion unit 428. The converted image data may be provided from the color conversion unit 428 to the picture output unit 430.

Optimized Modes for 4:2:2 and 4:2:0

4:2:2 format can be interpreted to include any chroma format and any filtering/downsampling that results in a 50% reduction in chroma samples as compared with a 4:4:4 representation. 4:2:0 format can be interpreted to include any chroma format and any filtering/downsampling that results in a 75% reduction in chroma samples as compared with a 4:4:4 representation.

Some prior disclosures discuss coding 4:2:2 video natively. For example, the '273 application includes a 4:2:2 mode. Enhancements described here are how to deal with Indexed Color History (ICH) and sub stream multiplexing (SSM) with 4:2:2 mode as well as describing a 4:2:0 mode.

When the source image is in 4:2:2 or 4:2:0 format, it may be advantageous to code the video natively in that format. 4:2:2 mode might encode four 3-sample units for a group of 6 pixels; two of the units may contain luma data and two of the units may contain chroma data. Other numbers of samples per unit are possible as well, such as 2 or 4, and the samples may be from the same horizontal line of pixels or one or more adjacent horizontal lines.

The 4:2:0 mode might encode a 12-pixel group with 4 luma units and 2 chroma units. Alternatively, the 4:2:0 mode might encode a 6-pixel group with 2 luma units and 1 chroma unit. In some implementations, alternating lines of 4:2:2 and 4:0:0 may be encoded, where appropriate adjustments to the bit allocation in the rate control are made to incorporate additional budget for lines with chroma samples. Again, other numbers of samples per unit are possible, and samples may be from one or more adjacent horizontal lines of pixels.

For 4:2:2 and 4:2:0 modes, special consideration may be given for how to encode ICH pixels. For 4:2:0, several methods are possible. For example, a subset of the luma samples could be aligned with chroma samples to form 3-component sets, and ICH indices could be assigned as if these sets were pixels. The remaining unassigned luma samples could be coded in several different ways. The remaining unassigned luma samples could be assigned ICH indices based on their proximity to existing luma sample values in the ICH. The remaining unassigned luma samples may be assigned indices based on some subset of available luma sample values (for example, a subset of the ICH and/or the selected ICH entries assigned to the 3-component sets). An ICH update algorithm might or might not update the MRU based on a luma-only ICH index. The remaining unassigned luma samples could also be coded using a prediction that might include interpolation of the luma samples of the 3-component sets.

The 4:2:2 and 4:2:0 modes may utilize different groupings for substream multiplexing. A 4:2:2 grouping might include two substream processors, one for luma and one for chroma. Four substream processors might be advantageous for a 4:2:2 grouping to provide additional throughput, particularly if the prediction is designed so that all of the luma samples can be processed in a single clock cycle.

A 4:2:2 and/or 4:2:0 mode may be used in conjunction with a transform mode or hybrid mode (for example, using the methods in '940) for luma in order to improve coding and throughput. For example, a 2×2 transform may be applied to the luma samples, and the luma coefficients may be grouped into units corresponding to different frequencies. The transform size may be larger or non-square, such as 4×2, and may be a DCT, DST, wavelet, subband decomposition, or other type of transform.

In some implementations, the optimized 4:2:2 mode may use 6-pixel groups instead of 3-pixel groups. Each group may consist of two luma units, a Cb unit, and a Cr unit. The $2^{nd}$ luma unit may be predicted from the first luma unit, and the size prediction for the $2^{nd}$ luma unit may be derived from the residuals for the first luma unit. Two SSP's may be used, and the SSP's may be updated twice per group. Six ICH indices may be used in ICH mode, one for each pixel. The odd ICH indices may only result in luma information and may not be used to update the ICH state. The rate control may work similarly to 4:4:4 mode except the group size is 6 pixels.

Figure 5:
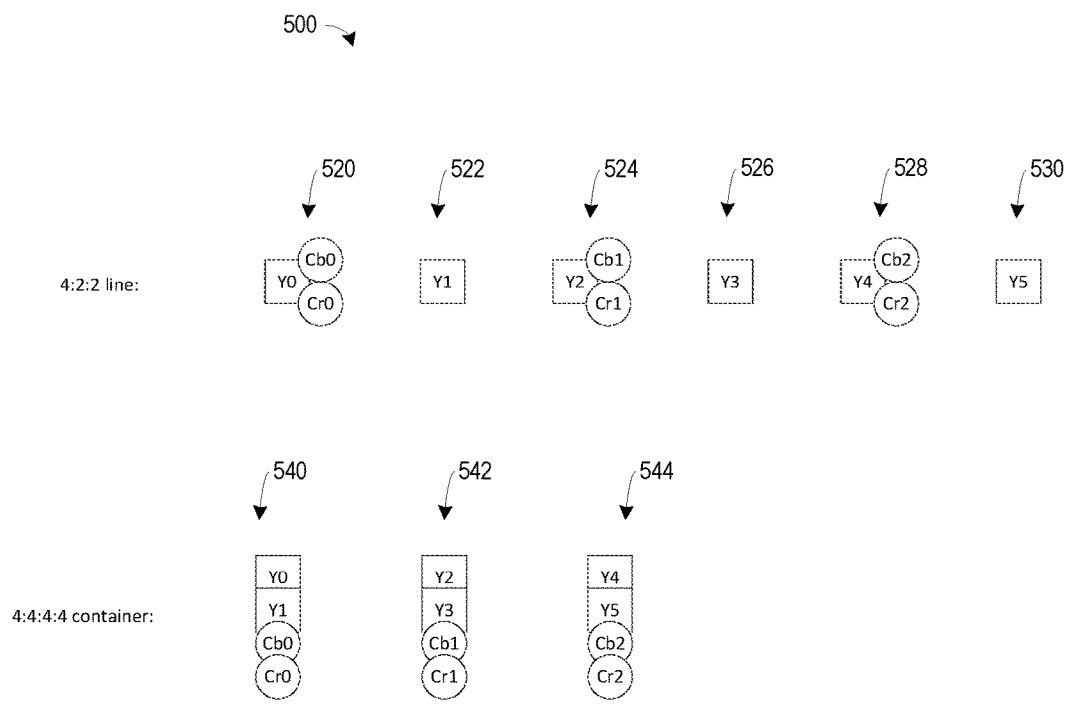
FIG. 5 is a diagram illustrating the formatting of video data into container pixels.

Now referring to FIG. 5, one example is illustrated of mapping native data into container pixels. Container pixels may be a single set of associated sample values that are coded as if they are taken from a picture in the container format. A container may be a virtual non chroma subsampled (e.g. 4:4:4 or 4:4:4:4) picture created by repackaging samples from a chroma subsampled (e.g. 4:2:0 or 4:2:2) picture. In this particular example, a native 4:2:2 mode is mapped into a 4:4:4:4 container. One possible spatial representation of the screen pixels is provided at 500. Pixel 520 includes a luma value Y0 and two chroma values Cb0 and Cr0. Pixel 522 includes only a luma value Y1. Pixel 524 includes a luma value Y2 and two chroma values Cb1 and Cr1. Pixel 526 includes a luma value Y3 and pixel value 528 includes a luma value Y4 and two chroma values Cb2 and Cr2. Pixel 530 includes only a luma value Y5. This 4:2:2 representation may be mapped into a group 510 of a 4:4:4:4 container. Component pixel 540 includes Y0 from pixel 520, Y1 from pixel 522, Cb0 from pixel 520, and Cr0 from pixel 520. As such, the luma samples and chroma samples of first two pixels are formed together into component pixel 540. Next, the samples of the second two pixels are formed together into component pixel 542. Component pixel 542 includes Y2 from pixel 524, Y3 from pixel 526, Cb1 from pixel 524, Cr1 from pixel 524. Component pixel 544 includes the samples of the last two pixels, Y4 from pixel 528, Y5 from pixel 530, Cb2 from pixel 528, and Cr2 from pixel 528.

Figure 6:
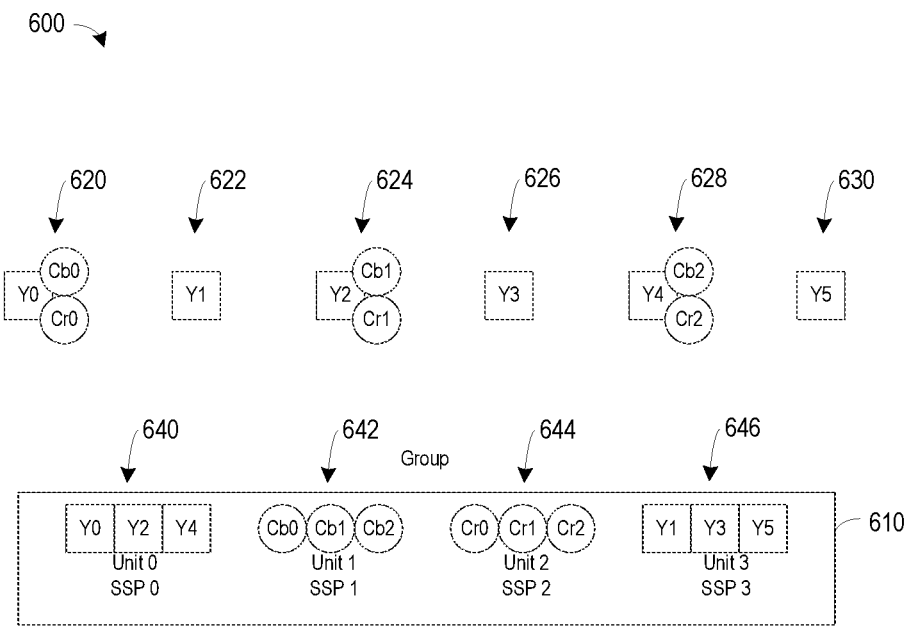
FIG. 6 is a diagram illustrating the formatting of video data into a container.

Now referring to FIG. 6, one example is illustrated of mapping native data into an container. In this particular example, a native 4:2:2 mode is mapped into a 4:4:4:4 container. One possible spatial representation of the screen pixels is provided at 600. Pixel 620 includes a luma value Y0 and two chroma values Cb0 and Cr0. Pixel 622 includes only a luma value Y1. Pixel 624 includes a luma value Y2 and two chroma values Cb1 and Cr1. Pixel 626 includes a luma value Y3 and pixel value 628 includes a luma value Y4 and two chroma values Cb2 and Cr2. Pixel 630 includes only a luma value Y5. In an alternative representation, the Cb and Cr samples may represent half-sample positions between adjacent luma samples. The 4:2:2 representation may be mapped into a group 610 of a 4:4:4:4 container. Unit 640 includes Y0 from pixel 620, Y2 from pixel 624, and Y4 from pixel 628. As such, the luma values of three even pixels are formed together into unit 640. A unit may be an entropy coding construct including a set of quantized residuals for a particular component. The unit 640 may be formed from every other or alternating pixels by position which can be accomplished by using even or odd samples. Next, the chroma blue samples from three pixels are formed together into unit 642. Unit 642 includes Cb0 from pixel 620, Cb1 from pixel 624, and Cb2 from pixel 628. Unit 644 includes the chroma red samples from three pixels, Cr0 from pixel 620, Cr1 from pixel 624, and Cr2 from pixel 628. The unit 646 includes the luma samples from the remaining pixels. As such, unit 646 includes Y1 from pixel 622, Y3 from pixel 626, and Y5 from pixel 630. The unit 646 may be formed from alternating opposite pixels by position with respect to unit 640 which can be accomplished by using odd pixels when unit 640 uses even pixels.

A possible way to implement 4:2:0 mode might treat subsets of luma samples as separate "components" of a virtual 4:4:4 container. A container component may be one of the three or four virtual components that would be coded in a container. When a codec runs in 4:4:4 mode, there may typically be three components, one luma and two chroma. In 4:2:0 mode, the three components could be even-position luma samples, odd-position luma samples, and chroma samples. In that example, the virtual 4:4:4 container has half the width of the 4:2:0 picture. In another example of 4:2:0 mode, the three components could be even-line luma samples, odd-line luma samples, and chroma samples. In that example, the virtual 4:4:4 container has half the height of the 4:2:0 picture. Chroma sample types may alternate every pixel horizontally or vertically. In another example, all chroma samples of a given type may be grouped with the left half of the virtual 4:4:4 container and the other type grouped with the right half. Alternatively, all chroma samples of a given type may be grouped with the top half of the virtual 4:4:4 container and the other type grouped with the bottom half.

The sample prediction in 4:2:0 mode for chroma may use samples of the same chroma type or the opposite chroma type or some function of the opposite chroma type. The luma prediction may or may not be constrained to use luma samples that have been packaged as the same component in the virtual 4:4:4 container. When MMAP or other vertical prediction is used, the luma samples used from the previous line may or may not be constrained to be of the same component in the virtual 4:4:4 container. If a quantization-adaptive blend is used, the filter taps may or may not be constrained to only use luma samples that are mapped to the same component type in the virtual 4:4:4 container. Block prediction may or may not be used, may apply to any or all of the component types in the 4:4:4 container, or may be applied without regard to the 4:4:4 container.

In some implementations, the 4:2:0 mode works by packaging the samples to look like a half-width 4:4:4 picture. The even luma samples may be treated as one component, the odd luma samples are treated as the $2^{nd}$ component, and the chroma samples (Cb on even lines, Cr on odd lines) are treated as the $3^{rd}$ component. The prediction and size prediction may treat the even and odd luma samples as independent components. The ICH may work similarly to 4:4:4 mode, except for a minor modification to allow pixel-wise addressing of ICH entries from the line above. The rate control may work the same as 4:4:4 mode except that a pixel time might become a pixel pair time (since two pixels might be encoded by the 2 luma and 1 chroma samples) and some minor modifications might be made to the rate control to ensure that the 2nd luma line (which contains the first Cr samples) is not overquantized.

Figure 7:
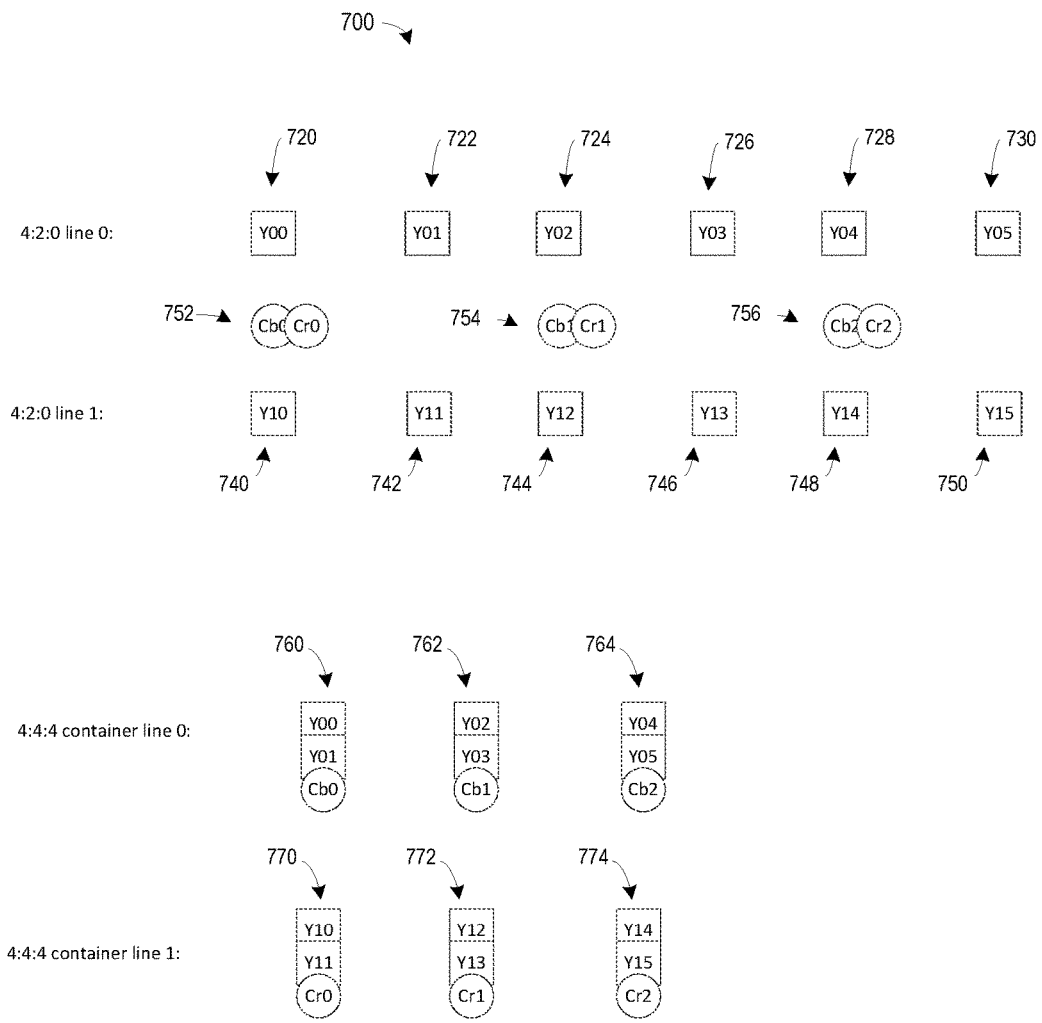
FIG. 7 is another diagram illustrating the formatting of video data into container pixels.

Now referring to FIG. 7, a representation of pixels in native 4:2:0 mode are shown being mapped into a 4:4:4 container. In this spatial representation 700, luma samples are provided for each pixel location in line 0 and line 1. The chroma samples are shared between corresponding even pixel locations in line 0 and line 1. For example, pixel 720 and pixel 740 are associated with chroma samples 752 located between line 0 and line 1. Each odd pixel, for example pixel 722 from line 0 and pixel 742 from line 1, includes luma samples from each line, but no chroma samples. Accordingly, the six pixels from each of line 0 and line 1 are mapped into two container component 710 and container component 712. Container component 710 may include the luma samples from line 1 and the chroma blue samples from lines 0 and 1. Container 712 may include the luma samples from line 1 and the chroma red samples from lines 0 and 1. As such, container pixel 760 may include the samples for the first two pixel from line 0, for example, Y00 from pixel 720, Y01 from pixel 722, and Cb0 from 752. Container pixel 762 includes the samples of the second two pixel from line 0, for example, Y02 from pixel 724, Y03 from pixel 726, and Cb1 from 754. Container pixel 764 includes the samples of the last two pixels, for example, Y04 from pixel 728, Y05 from pixel 730, and Cb2 from 756.

Container pixel 770 of container component 712 includes the samples for the first two pixels from line 1, for example, Y10 from pixel 740, Y11 from pixel 742, and Cr0 from 752. Container pixel 772 includes the samples for the second two pixels from line 1, for example, Y12 from pixel 744, Y13 from pixel 746, and Cr1 from 754. Container pixel 774 includes the samples associated with the last two pixels in line 1, for example, Y14 from pixel 748, Y15 from pixel 750, and Cr2 from 756.

Figure 8:
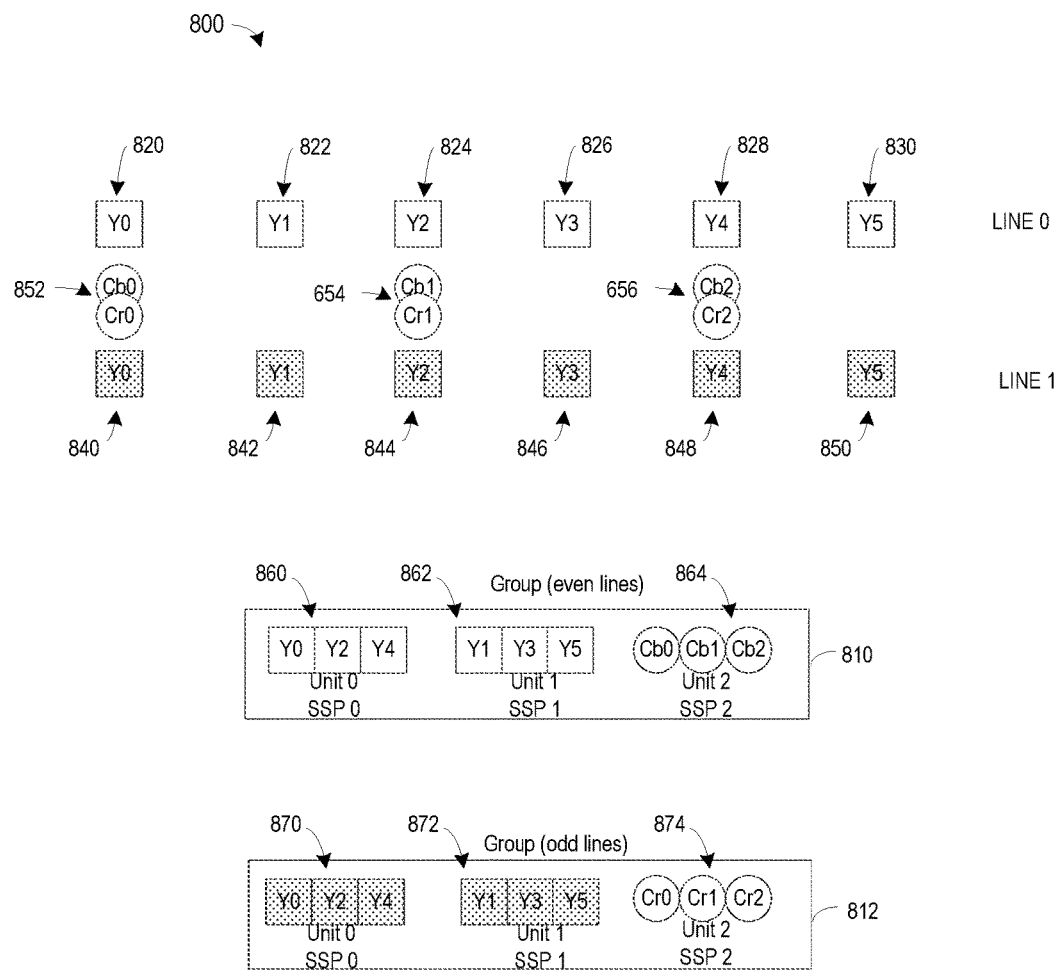
FIG. 8 is another diagram illustrating the formatting of video data into a container.

Now referring to FIG. 8, a representation of pixels in native 4:2:0 mode are shown being mapped into a 4:4:4 container. In this spatial representation 800, luma samples are provided for each pixel location in line 0 and line 1. The chroma samples are shared between corresponding even pixel locations in line 0 and line 1. For example, pixel 820 and pixel 840 are associated with chroma samples 852 located between line 0 and line 1. Each odd pixel, for example pixel 822 from line 0 and pixel 842 from line 1, includes luma samples from each line, but no chroma samples. Accordingly, the six pixels from each of line 0 and line 1 are mapped into two groups 810 and 812. Group 810 may include the luma samples from line 1 and the chroma blue samples from lines 0 and 1. Container 812 may include the luma samples from line 1 and the chroma red samples from lines 0 and 1. As such, unit 860 may include the even luma samples from line 0, for example, Y0 from pixel 820, Y2 from pixel 824, and Y4 from pixel 828. The unit 860 may be formed from every other or alternating pixels by position which could be accomplished by using even or odd pixels. Unit 862 includes the odd luma samples from line 0, for example, Y1 from pixel 822, Y3 from pixel 826, and Y5 from pixel 830. The unit 862 may be formed from alternating opposite pixels by position with respect to unit 860 which can be accomplished by using odd pixels when unit 860 uses even pixels of line 0. Unit 864 includes the chroma blue samples associated with lines 0 and 1, for example, Cb0 from 852, Cb1 from 854, and Cb2 from 856.

Unit 870 of group 812 includes the even luma samples from line 1, for example, Y0 from pixel 840, Y2 from pixel 844, and Y4 from pixel 848. Unit 872 includes the three odd luma samples from line 1, for example, Y1 from pixel 842, Y3 from pixel 846, and Y5 from pixel 850. Unit 874 includes the red chroma samples associated with lines 0 and 1, for example, Cr0 from 852, Cr1 from 854, and Cr2 from 856.

Special consideration may be provided in 4:2:0 mode for ICH handling. In one example, the ICH in the virtual 4:4:4 container does not have any special handling. In another example, the ICH indices from the line above may include virtual 4:4:4 pixels that could have odd luma samples in the even luma sample component and even luma samples in the odd luma sample component. In another example, a bitstream code (either fixed or variable length) may indicate that even and odd luma sample components are swapped. In one example the chroma types in the ICH are ignored and chroma samples may be used for either type. In another example, the chroma types in the ICH are enforced and chroma samples of the same type are referenced. In another example, the chroma types in the ICH are stored in independent storage units and either type can be referenced depending on the chroma type.

In some implementations of 4:2:2 mode, each chroma sample in the input picture may be associated with a luma sample, and some luma samples have no associated chroma sample. Each entry in the ICH, however, may still comprise three components, and unused chroma components may be simply ignored. References to a previous line's chroma samples may return either the collocated chroma samples or, if unavailable, the chroma samples immediately to the left.

Figure 9:
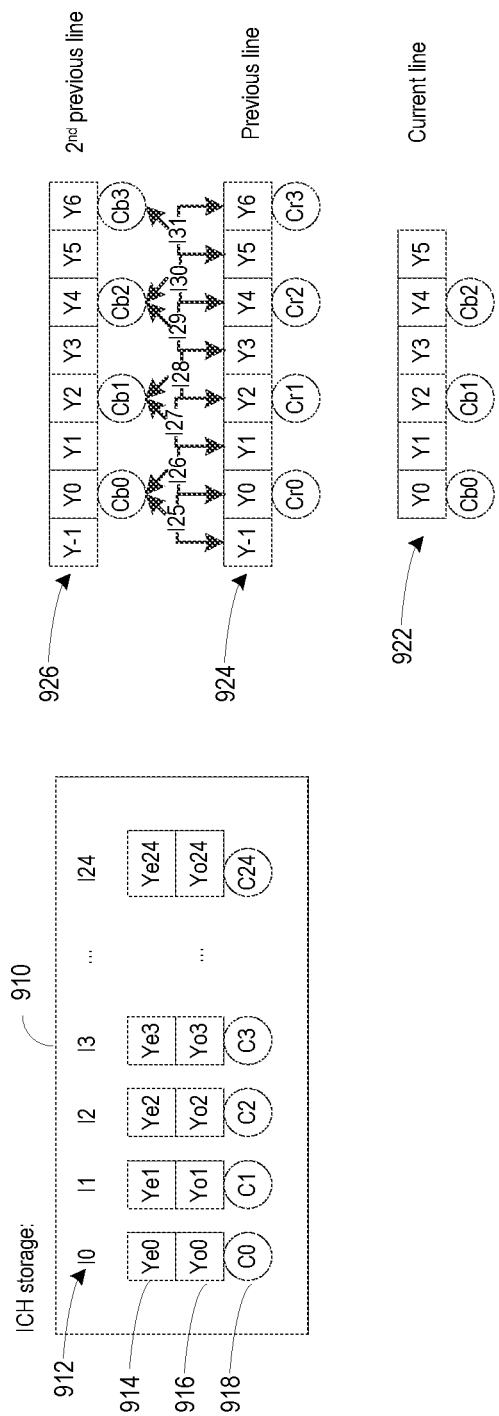
FIG. 9 is a diagram illustrating one implementation of an indexed color history (ICH) storage.

In some implementations of 4:2:0 mode as illustrated in FIG. 9, each ICH entry may contain two adjacent luma sample and a chroma sample (Cb for even lines and Cr for odd lines). The chroma type (Cb or Cr) may not be recorded, so the chroma value may be used to fill in either a Cb or Cr component when used. When referring to previous lines, the chroma type may refer to a sample on the $2^{nd}$ previous line since it has the chroma type. The pairs of adjacent luma samples on the previous line can start on any pixel boundary and are not restricted to even pairs.

Now referring to FIG. 9, a diagram illustrating the formation of ICH entries is provided. An example ICH storage 910 includes multiple ICH entries. For example, ICH entry 11 at 912 may include an even line luma sample 914 and odd line luma sample 916. The entry 11 also may include a single chroma sample 918. This format may be duplicated for each entry. To illustrate the formation of each entry, three lines are illustrated, the current line 922, the previous line 924, and the second previous line 926. The ICH storage entry 125 may use the Y−1 and Y0 luma samples from the previous line and the Cb0 chroma sample from the second previous line. In a similar manner, ICH entry 126 may use luma sample Y0 and luma sample Y1 from the previous line and Cb0 chroma sample from the second previous line. The ICH entry 127 may use Y1 luma sample and Y2 luma sample from the previous line and Cb1 chroma sample from the second previous line. The other ICH entries may be composed in a similar manner.

Special consideration may be provided in 4:2:0 mode for flatness detection. In one example, the chroma and luma may be spatially aligned and no special handling is needed. In another example, the luma and chroma may not be aligned and the flatness detection may look at multiple locations in the original image. For any mode (4:2:0, 4:2:2, or 4:4:4), the flatness detection may assume some characteristic about the flatness of first groups of lines (very flat, somewhat flat, or something else) to improve quality of the left-hand side of slices when a search of the next line's pixels may be impractical or expensive to implement.

Special consideration may be provided in 4:2:0 mode for rate control. In one example, the chroma type may alternate from line to line. In this case, it may be desirable to try to reduce the quantization for chroma samples on the $2^{nd}$ line of a slice since they cannot use vertical prediction using the same chroma type. In one example, the rate control may provide an extra allocation of bits (second_line_bpg_offset) to the second line of a slice to ensure these samples are quantized less, which may be offset by another parameter (nsl_bpg_offset) on other slice lines. In another example, the rate control may offset the rate model by a fixed amount at the beginning of the second line. In another example, the rate control may impose a maximum quantization level that may be used for the first group or groups on the second line of a slice.

Midpoint Prediction

The midpoint prediction (MPP) considers the LSB's from samples in previous lines of the slice to improve quality when it is used. An improvement to the midpoint prediction may be to consider samples from the previous line when determining the LSB's to use for the predictor. In one example, the LSB's from the samples in the immediate line are used directly. In another example, the LSB's from the samples in the previous line may be combined with previously decoded samples in the current line (for example, using MAP) in order to create the LSB's to use for MPP.

Managing Mux Word Sizes

In systems where substream multiplexing is used, it may be desirable to use the smallest mux word size possible to reduce cost. In other systems, minimizing the maximum syntax element size often presents a significant cost benefit. Several techniques can be used to reduce the mux word size.

One technique may be to reduce the sample depth for modes where the added sample depth is unlikely to result in much visual impact. For example, when coding a high bit depth (such as 16 bits/component), the RGB to YCoCg-R color space conversion may be modified as follows:

$$cscCo = R - B$$

$$t = B + (cscCo >> 1)$$

$$cscCg = G - t$$

$$Y = t + (cscCg >> 1)$$

$$Co = ((cscCo + 1) >> 1) + 32768$$

$$Cg = ((cscCg + 1) >> 1) + 32768$$

And the reverse operation of YCoCg-R to RGB may be modified as follows:

$cscCo = (Co - 32768) << 1$ $cscCg = (Cg - 32768) << 1$ $t = Y - (cscCg >> 1)$ $cscG = cscCg + t$ $cscB = t - (cscCo >> 1)$ $cscR = cscCo + cscB$ $R = \text{CLAMP}(cscR, 0, \text{maxVal});$ $G = \text{CLAMP}(cscG, 0, \text{maxVal});$ $B = \text{CLAMP}(cscB, 0, \text{maxVal});$ The combination of these operations reduces the effective sample depth of the chroma from 17 bits to 16 bits, which saves bits in the syntax and would generally be imperceptible.

Another way to reduce the bit depth of the syntax may be to limit the size of the DSU-VLC prefix for certain cases. For example, the prefix size may be limited to 13 bits if the QP is 0. A prefix that is the maximum size then may indicate that midpoint prediction is used. In another example, the DSU size prediction may be limited to be a minimum size in order to ensure prefixes do not exceed a certain maximum size. In another example, certain parts of the syntax (for example ICH mode) may be disallowed under certain conditions (for example, when the QP is 0).

Adaptive Filtering

Adaptive filtering of input samples can help improve the appearance of some types of natural images. The adaptive filtering in '547 applies to samples used for prediction on both encoders and decoders; however, the present disclosure described adaptive filtering applied to original pixels before quantization. The filtering may be linear or nonlinear; vertical, horizontal, and/or diagonal; and may be FIR, IIR, or something else. The filtering results in a filtered image f(x,y). In some cases, the filtering may include taps that reference reconstructed pixels.

Adaptive filtering blends the filtered image with the source image prior to compression. The adaptively filtered image may be used as the input for the encoder, or it may be used only for parts of the encoder (for example, just at the input to the prediction loop), where other parts of the encoder may use unfiltered source pixels.

The blend can be controlled by a number of different variables in the system. For example, the quantization parameter, buffer fullness, rc_model_fullness, local image activity, etc., may all be inputs to a function that generates a blend parameter. Different blending methods may be used such as alpha blending or the generalized blend. For example, one possible blend might be:

$Q\text{level} = \text{MapQPToQlevel}(\text{current\_QP});$ $\text{diff} = \text{orig}(x,y) - \text{filt}(x,y);$ $\text{diff\_clamped} = \text{CLAMP}(\text{diff}, -\text{QuantDivisor}[Q\text{level}]/2, +\text{QuantDivisor}[Q\text{level}]/2);$ $\text{Adapt}(x,y) = \text{orig}(x,y) + \text{diff\_clamped};$ The coding scheme may also add a function g( ) of previous reconstructed errors (e.g., g(ABS(orig(x,y)−recon(x,y))), for some subset of (x,y) that has already been coded) to the source pixels before coding. The previous reconstructed errors might be from the current line or previous lines. This adjustment may be done on some paths (for example, just the prediction loop) or on all source pixels. This adjustment may be before or after the adaptive filtering. For example:

$\text{Adjusted}(x,y) = \text{orig}(x,y) + \frac{1}{2} * (\text{ABS}(\text{orig}(x-1,y) - \text{recon}(x-1,y))$ Entropy Coding Some improvements to the entropy coding scheme presented in '273 and other similar schemes are presented in this section.

When the source content is not predictable (for example, uniformly-distributed random samples in all components), the DSU-VLC entropy coding in '273 spends bits on syntax that could be used to improve PSNR and image quality. Therefore, a "bypass syntax" mode is added to avoid spending unnecessary bits for this type of content.

"Bypass syntax" can mean that some of the syntax is not sent. For example, it can mean that no prefixes are sent and the maximum size is therefore assumed. In addition or instead, it can mean that no flatness indication or ICH indices are being sent. It may mean that a certain prediction mode is assumed (for example, midpoint prediction) or that no prediction is used.

"Bypass syntax" mode may be signaled either implicitly or explicitly. An explicit indication might be sent when the upcoming coded pixels are expected to be coded most efficiently in "bypass syntax" mode; for example, if the activity is high while the buffer fullness is high. An implicit indication might be that the QP is >= some predetermined value and/or if the buffer fullness is >= a threshold. An implicit/explicit signal may also be used; for example, a bit in the syntax could signal to "bypass syntax" for some number of the groups provided that the buffer fullness and/or QP is >= a threshold or thresholds.

The rate control may also be designed to save bits when the source content is not predictable. In one embodiment, the rate control increases the QP when the characteristics of the recently encoded bitstream resemble a coded bitstream with unpredictable source content. Examples of characteristics of a coded bitstream with unpredictable source content include multiple selections of MPP mode across different components, ICH selections with random indices, large and/or varying coded residuals, large size predictions, and similar characteristics.

The DSU-VLC entropy coding scheme can also be improved by improving the size predictions. This can be done using several techniques. In DSU-VLC, the predicted size is a function of the actual sizes of one or more of the residuals in one or more previous groups. Techniques can be applied to make the function adaptive to the content. A simple example would be to gather a histogram of some function (for example, an FIR filter) of one or more residuals in one or more previous groups along with the actual required unit sizes for a given picture. A mapping could be created between the function output and the lowest cost predicted size through estimation (for example, maximum likelihood), where the cost function used in the estimation is the bit cost for an erroneous prediction. Variations might include doing the mapping per slice, using some other method of function optimization, and introducing more information into the function.

Another method that could be used to improve the DSU-VLC encoding would be to use predicted sizes from one or more previous lines. For example, the QP-adjusted size (defined as size+qlevel) could be stored in a memory and the predicted size could equal some function of the QP-adjusted size for previous group to the left and the vertically adjacent group; for example:

Pred_size=CLAMP(MIN(QP_adj_size_above,QP_adj_size_left)-qlevel,0,max_size-1);

Or:

Pred_size=CLAMP(QP_adj_size_left+QP_adj_size_above-QP_adj_size_top_right)-qlevel,0,max_size-1);

Or:

Pred_size=CLAMP(QP_adj_size_left+QP_adj_size_above-QP_adj_size_top_left)-qlevel,0,max_size-1);

This pred_size could be further modified by some other function or mapping, as that function could vary depending on previous slices or frames or some other content analysis.

ICH

The '979 application describes an indexed color cache for efficient coding of content with re-occurring pixel values. Techniques are described below for improving IC$/ICH decisions in the encoder.

An encoder may look ahead one or more groups to improve the decisions for the current group. In one embodiment, the encoder performs an ICH search using the pixels on the next group to determine if an ICH selection is likely for the next group. The encoder may include original pixels from the current group in the search. If ICH selection for the next group is likely, the ICH decision for the current group may be biased more toward selecting ICH to minimize mode switching.

In another embodiment, the encoder may fully or partially encode one or more subsequent groups. Some measure of distortion (such as SAD, MSE, or max sample error, or functions thereof) may be computed for different permutations of ICH mode/P mode selection. In addition, the number of bits used may be calculated for each possible coding path. A cost function is computed that is a function of the distortion and the number of bits; for example, cost=distortion+lambda*bits_used. The mode selection for the current group may be the mode that results in the lowest cost path. The analysis may be done on the immediate subsequent group, or the path may be followed without any further computation.

The mode selection may include other explicitly signaled encoder modes. In one embodiment, the flatness indication is included in the rate-distortion analysis. In a coding system that supports a DPCM/transform decision, that decision could be included in the analysis.

Rate Control

In some implementations, the quantization parameter for the implicit part of the rate control may be derived using a proportional-integral-derivative (PID) controller. A PID controller sums a proportional, integral, and derivative term to provide control for a feedback loop. In the case of a compression system, the process variable may be either the actual number of bits generated per group, the number of bits that would have been generated if the size prediction were ideal (rcSizeGroup), or the predicted size for the current or next group.

The setpoint may be constant or a function of buffer fullness. It may be equal to the nominal programmed bits/group modified by some function of the current position in the slice. It may be further modified by a bpg_offset that is a function of buffer fullness.

The PID controller equation may be given as:

$$u(t_k) = u(t_{k-1}) + K_p\left[\left(1 + \frac{\Delta t}{T_i} + \frac{T_d}{\Delta t}\right)e(t_k) + \left(-1 - \frac{2T_d}{\Delta t}\right)e(t_{k-1}) + \frac{T_d}{\Delta t}e(t_{k-2})\right]$$

Where $T_i = K_p/K_i$ and $T_d = K_d/K_p$. The value $u(t_k)$ is the QP value to determine, $e(t_k)$ is the error defined as setpoint—process variable, $\Delta t$ is the sampling time, and the K values are tuning parameters. The tuning parameters may be either fixed in hardware, explicitly signaled, or implicitly adaptive.

The resulting quantization parameter may be clamped to ensure that the QP values are within a valid range. In addition or alternatively, the quantization parameter may be clamped to a range of values that is a function of the buffer fullness or some modeled fullness (which may be current or from some previous group). The quantization parameter may be further modified in response to some explicit signal of flatness or an implicit or explicit overflow and/or underflow prevention mechanism.

The measure of activity used for an implicit rate control scheme such as that used in '273 or the above PID-based scheme may be averaged or low-pass filtered in order to create a more stable measure of the activity. For example, the activity may be filtered with and IIR or FIR filter.

As mentioned previously, the activity may be a measure of the entropy coding results of one or more previous groups. Alternatively, it may be measured as the predicted size for the next group. Or it might be a function of the samples in one or more previous reconstructed groups.

Alternate Sample Groupings

Figure 10:
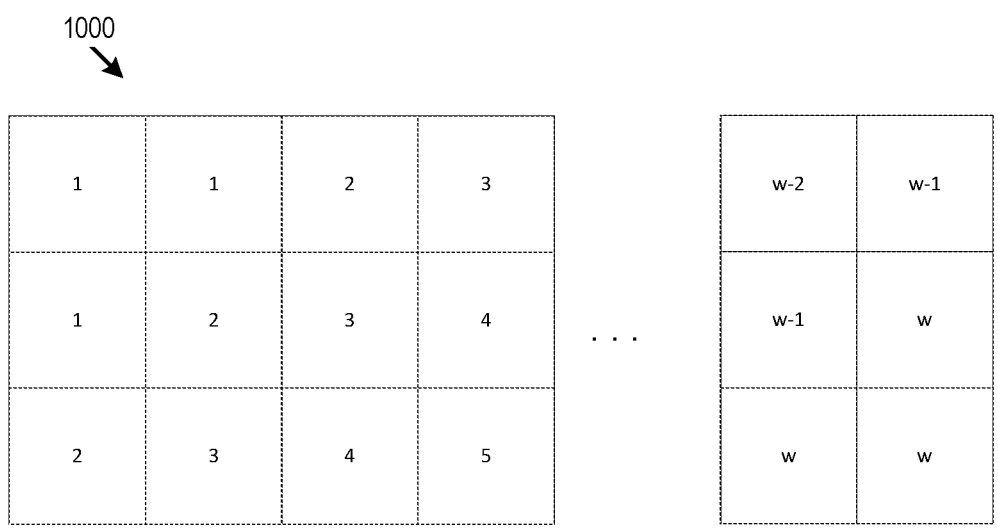
FIG. 10 is a diagram illustrating one implementation of an alternate sample grouping.

Many systems utilize raster-order rectangular blocks of samples; however, other groupings are possible that may allow for improving throughput. Some examples are given below. Specifically some groupings may be in non-raster order. One example grouping is illustrated at 1000 in FIG. 10. The sample locations labeled with the same number belong to the same group. In FIG. 10, w represents the width of the line. Another example grouping is illustrated at 1100 in FIG. 11. Again in FIG. 11, the sample locations labeled with the same number belong to the same group and w represents the width of the line. The alternate sample groupings enhance the availability of adjacent samples which results in improved encoder throughput and improved quality when decoder throughput is high.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A video encoder comprising:
   circuitry configured to:
      receive a 4:2:0 format picture;
      form a first component within a first group of a 4:4:4 container with a first set of luma samples of alternating positions from a first line of the 4:2:0 mode picture;
      form a second component within the first group of the 4:4:4 container with a second set of luma samples from the first line of the 4:2:0 mode picture of opposite alternating positions with respect to the first set of luma samples in the first component;
      form at least one chroma component within the first group, the at least one chroma component having a first set of chroma samples from the 4:2:0 mode picture; and
      transmit the 4:4:4 container.

2. The video encoder according to claim 1, wherein the at least one chroma component comprises chroma blue components associated with the first set of luma samples.

3. The video encoder according to claim 1, the circuitry being further configured to:
   form a first component within a second group of the 4:4:4 container with a third set of luma samples of alternating positions from a second line of the 4:2:0 format picture;
   form a second component within the second group of the 4:4:4 container with a fourth set of luma samples from the second line of the 4:2:0 format picture, the fourth set of luma samples having opposite alternating positions with respect to the third set of luma samples in the first component; and
   form at least one chroma component within the second group, the at least one chroma component within the second group having a second set of chroma samples from the 4:2:0 format picture.

4. The video encoder according to claim 3, wherein the at least one chroma component within the second group comprises chroma red components associated with the first and third set of luma samples.

5. The video encoder according to claim 3, wherein the first group includes three components and the second group includes three components.

6. The video encoder according to claim 5, wherein six pixels from the first line and six pixels from the second line are mapped into the first and second groups.

7. The video encoder according to claim 1, wherein indexed color history (ICH) entries are formed based on an even luma sample from an immediately preceding line, an odd luma sample from the immediately preceding line and a chroma sample from a second preceding line.

8. A video encoder comprising:
   circuitry configured to:
      receive a chroma subsampled picture;
      form a first component within a first group of a non-subsampled container with a first set of luma samples of alternating positions from a first line of the chroma subsampled picture;
      form a second component within a first group of a non-subsampled container with a second set of luma samples from the first line of the chroma subsampled picture of opposite alternating positions with respect to the first set of luma samples in the first component;
      form at least one chroma component within the first group, the at least one chroma component comprising a first set of chroma samples from the chroma subsampled picture; and
      encode the non-subsampled container.

9. The video encoder according to claim 8, wherein the at least one chroma component comprises chroma blue components associated with the first set of luma samples.

10. The video encoder according to claim 8, the circuitry being further configured to:
    form a first component within a second group of the non-subsampled container with a third set of luma samples of alternating positions from a second line of the chroma subsampled picture;
    form a second component within the second group of the non-subsampled container with a fourth set of luma samples from the second line of the chroma subsampled picture, the fourth set of luma samples having opposite alternating positions with respect to the third set of luma samples in the first component; and
    form at least one chroma component within the second group, the at least one chroma component within the second group having a second set of chroma samples from the chroma subsampled picture.

11. The video encoder according to claim 10, wherein the at least one chroma component within the second group comprises chroma red components associated with the first and third set of luma samples.

12. The video encoder according to claim 10, wherein the first group includes three components and the second group includes three components.

13. The video encoder according to claim 12, wherein six pixels from the first line and six pixels from the second line are mapped into the first and second groups.

14. The video encoder according to claim 8, wherein the at least one chroma component comprising first and second chroma components, the first chroma component being formed from chroma red samples and the second chroma component being formed from chroma blue samples.

15. The video encoder according to claim 14, wherein the first group comprises four components.

16. The video encoder according to claim 15, wherein six pixels are mapped into the first group.

17. The video encoder according to claim 8, wherein indexed color history (ICH) entries are formed based on an even luma sample from an immediately preceding line, an odd luma sample from the immediately preceding line and a chroma sample from a second preceding line.

18. A video decoder comprising:
  circuitry configured to:
    receive a 4:4:4 container with a first group including a first component having a first set of luma samples of alternating positions, a second component having a second set of luma samples in opposite alternating positions with respect to the first set of luma samples in the first component, and at least one chroma component having a first set of chroma samples corresponding to the first set of luma samples;
    extract the first set of luma samples from the first component;
    extract the second set of luma samples from the second component;
    extract the first set of chroma samples from the at least one chroma component; and
    generate a 4:2:0 picture including the first set of luma samples being located on a first line at alternating positions, the second set of luma samples being located on the first line at opposite alternating positions with respect to the first set of luma samples, and the chroma samples being corresponding to the first set of luma samples.

19. The video decoder according to claim 18, wherein the 4:4:4 container having a second group including a first component having a third set of luma samples of alternating positions, a second component having a fourth set of luma samples in opposite alternating positions with respect to the third set of luma samples in the first component, and at least one chroma component having a second set of chroma samples corresponding to the first and third set of luma samples, the circuitry being configured to:
    extract the third set of luma samples from the first component of the second group;
    extract the fourth set of luma samples from the second component of the second group;
    extract the second set of chroma samples from the at least one chroma component of the second group; and
    generate the 4:2:0 video including the third set of luma samples being located at alternating positions, the fourth set of luma samples being located at opposite alternating positions with respect to the first set of luma samples, and the second set of chroma samples.

20. The video decoder according to claim 19, wherein the first group includes three components and the second group includes three components, the circuitry being configured to map the first and second groups into six pixels on the first line of the 4:2:0 picture and six pixels on a second line of the 4:2:0 picture.

21. A video encoder comprising:
  circuitry configured to:
    receive a 4:2:2 picture;
    form a first component within a first group of a 4:4:4:4 container with a first set of luma samples of alternating positions from a first line of the 4:2:2 picture;
    form a second component within a first group of a 4:4:4:4 container with a second set of luma samples from the first line of the 4:2:2 picture of opposite alternating positions with respect to the first set of luma samples in the first component;
    form at least one chroma component within the first group, the at least one chroma component comprising a first set of chroma samples from the 4:2:2 picture; and
    encode the 4:4:4:4 container.

* * * * *